W. RODGERS.
Cultivator.
No. 82,753.
Patented Oct. 6, 1868.
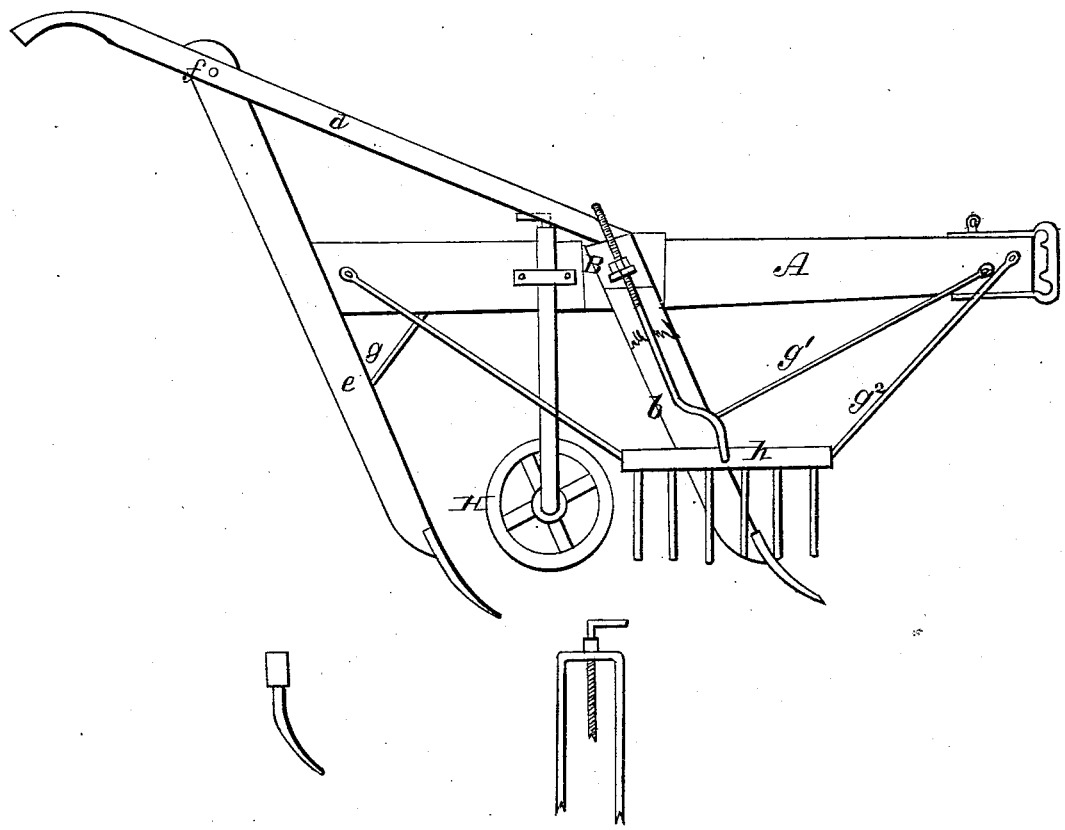
WITNESSES:
INVENTOR:

UNITED STATES PATENT OFFICE.

WILLIAM RODGERS, OF LYNNVILLE, INDIANA.

IMPROVEMENT IN CULTIVATORS.

Specification forming part of Letters Patent No. 82,753, dated October 6, 1868.

*To all whom it may concern:*

Be it known that I, WILLIAM RODGERS, of Lynnville, in the county of Warrick and State of Indiana, have invented a new and Improved Cultivator; and I do hereby declare that the following is a full and exact description of the same, reference being had to the accompanying drawing, and to the letters of reference marked thereon.

This invention relates to certain improvements in cultivators; and it consists more particularly in the peculiar construction and arrangement of a rake, so that while the clods are prevented from falling against the corn the finely-pulverized earth is sifted through upon the rows.

The drawing shows a side view of a cultivator with my improved attachment, one forward tooth being represented as broken away in order to show the duplicate behind it.

The main beam A of the cultivator is of the ordinary construction. Across it, a little forward of the center, is bolted a beam, B, which supports on its ends inclined legs $b$ $b$, terminating in the plow-points ordinarily adapted to cultivators. From the upper side of this transverse beam, and near its extremities, project backward the handles $d$ $d$.

On the rear side of the main beam A is an inclined leg, $e$, projecting downward like $b$ $b$, and similarly shod. Its upper end extends to a point between the handles, and is attached to them for mutual support by the transverse round $f$, which passes through the handles and the top of part $e$. These legs are braced by diagonal rods $g$ $g'$ $g''$, which pass through the leg and forward and upward through the beam, being fastened by nuts or in any suitable manner.

Just behind the cross bar or beam B is a guide and steadying wheel, H, arranged directly under the main beam. This wheel is supported by a bar of ox-bow shape, which bestrides the beam with its open ends downward, and having pivoted between them the wheel. The wheel is raised and lowered by a hand-screw passing through the bent part of the support vertically into the beam A.

From the end of the beam B, on the right side, is suspended the rake K. It is provided with a vertical rod, attached near its central part, the top of which rod passes through the end of the beam B, or through a loop-hole in the end of the beam, and is adjusted at any desired height by means of the screw upon its top. The rake is still further braced by rods movably pivoted at its extremities and projecting backward and forward to the main beam A. The rods are so pivoted as to allow of vertical motion in the rake. The teeth of the rake are ordinarily about two inches apart, but of course may be set at greater or less distance. They may also be bent slightly inward.

In the operation of my improved cultivator, the central wheel being let down sufficiently to touch the ground, allowing the plow to go as deep as may be required, regulates at once the depth and steadies the cultivator in its direct forward movement, preventing it from swaying from side to side and pushing the rake against the rows of corn. The rake itself holds back all the larger clods which are thrown out by the plows and might otherwise fall against the growing plants, while at the same time it freely permits all the finer earth to sift through, thus performing a part which could, without this improvement, be as well performed only by hand. It is essential that the teeth should be arranged vertically to prevent constant clogging, it being easy, by a slight lateral shake of the plow, to relieve vertical teeth from any adhering substance. At the same time the vertical teeth better serve the purpose of smoothing the side of the furrow.

Having thus fully described my improvement, I wish it understood that I do not claim any part of the construction of the cultivator itself as new, or, broadly, a guard attached thereto; but

What I do claim, and desire to secure by Letters Patent of the United States, is—

The rake K, supported and braced as described by the vertical and lateral rods, and having itself vertical teeth, in combination with the cultivator provided with the steadying-wheel H, all constructed and arranged as and for the purpose set forth.

This specification signed and witnessed this 24th day of July, 1868.

WILLIAM RODGERS.

Witnesses:
E. H. MARTIN,
A. E. CAMP.